US010735906B2

(12) United States Patent
Tamilin et al.

(10) Patent No.: US 10,735,906 B2
(45) Date of Patent: Aug. 4, 2020

(54) COMPUTING ANALYTICS BASED ON INDOOR LOCATION DATA STREAMS

(71) Applicant: THINKINSIDE S.R.L, Trento (IT)

(72) Inventors: Andrei Tamilin, Trento (IT); Iacopo Carreras, Trento (IT); Tommaso Schiavinotto, Trento (IT); Daniele Miorandi, Trento (IT)

(73) Assignee: THINKINSIDE S.R.L (IT)

( * ) Notice: Subject to any disclaimer, the term of this patent is extended or adjusted under 35 U.S.C. 154(b) by 0 days.

(21) Appl. No.: 16/343,194

(22) PCT Filed: Oct. 19, 2017

(86) PCT No.: PCT/EP2017/076796
§ 371 (c)(1),
(2) Date: Apr. 18, 2019

(87) PCT Pub. No.: WO2018/073390
PCT Pub. Date: Apr. 26, 2018

(65) Prior Publication Data
US 2019/0246242 A1    Aug. 8, 2019

(30) Foreign Application Priority Data

Oct. 19, 2016  (IT) .................. 102016000105108

(51) Int. Cl.
*H04W 4/029*    (2018.01)
*H04W 4/02*     (2018.01)
(Continued)

(52) U.S. Cl.
CPC .......... *H04W 4/029* (2018.02); *H04W 4/023* (2013.01); *H04W 16/14* (2013.01); *H04W 16/24* (2013.01);
(Continued)

(58) Field of Classification Search
CPC ....... H04W 4/33; H04W 64/00; H04W 4/029; H04W 4/30; H04W 4/80; H04W 84/12;
(Continued)

(56) References Cited

U.S. PATENT DOCUMENTS

2013/0085861 A1    4/2013 Dunlap
2015/0194000 A1    7/2015 Schoenfelder et al.
(Continued)

FOREIGN PATENT DOCUMENTS

CN          105260901 A      1/2016

OTHER PUBLICATIONS

European International Search Report and the Written Opinion, European Patent Office, dated Jan. 2, 2018, pp. 1-12.

*Primary Examiner* — Fred A Casca
(74) *Attorney, Agent, or Firm* — The Belles Group, P.C.

(57) ABSTRACT

A system comprising: an indoor localisation system to localise a tracked entity in an indoor environment and to output an indoor location data stream comprising indoor location data representing locations assumed by the tracked entity in the indoor environment; an analytics computing system designed to receive and process the indoor location data stream from the indoor localisation system to compute entity-related analytics; wherein the analytics computing system is designed to: identify in the indoor location data stream one or more sessions, each representing a corresponding period during which a tracked entity carries out an associated activity in the indoor environment, based on an indoor environment model specifying one or more session open/close rules, and compute, for one or more identified sessions, associated track data representing a track travelled by the tracked entity in the indoor environment during an identified session, based on the indoor location data stream (208).

6 Claims, 14 Drawing Sheets

(51) Int. Cl.

| | |
|---|---|
| *H04W 16/24* | (2009.01) |
| *H04W 16/26* | (2009.01) |
| *H04W 16/14* | (2009.01) |
| *H04W 16/28* | (2009.01) |
| *H04W 4/33* | (2018.01) |
| *H04W 4/021* | (2018.01) |
| *H04L 1/06* | (2006.01) |
| *H04L 5/02* | (2006.01) |
| *H04L 5/00* | (2006.01) |
| *H04W 16/32* | (2009.01) |
| *H01Q 1/24* | (2006.01) |
| *H01Q 21/24* | (2006.01) |
| *H01Q 25/00* | (2006.01) |
| *H04B 7/06* | (2006.01) |
| *H04B 7/0413* | (2017.01) |
| *H04B 7/0408* | (2017.01) |
| *H04B 7/0404* | (2017.01) |

(52) U.S. Cl.
 CPC ........... *H04W 16/26* (2013.01); *H04W 16/28* (2013.01); *H01Q 1/246* (2013.01); *H01Q 21/24* (2013.01); *H01Q 25/002* (2013.01); *H04B 7/0404* (2013.01); *H04B 7/0408* (2013.01); *H04B 7/0413* (2013.01); *H04B 7/0619* (2013.01); *H04B 7/0621* (2013.01); *H04B 7/0697* (2013.01); *H04L 1/06* (2013.01); *H04L 1/0612* (2013.01); *H04L 1/0687* (2013.01); *H04L 5/006* (2013.01); *H04L 5/023* (2013.01); *H04W 4/021* (2013.01); *H04W 4/33* (2018.02); *H04W 16/32* (2013.01); *Y02D 70/1264* (2018.01); *Y02D 70/164* (2018.01)

(58) Field of Classification Search
 CPC . H04W 4/025; H04W 64/003; H04W 16/225; H04W 16/20; H04B 17/318; H04B 17/391; H04B 17/27
 See application file for complete search history.

(56) References Cited

U.S. PATENT DOCUMENTS

| | | | |
|---|---|---|---|
| 2017/0026804 A1* | 1/2017 | Tsai | G01S 5/0278 |
| 2017/0215041 A1* | 7/2017 | Liu | H04W 40/244 |
| 2018/0224854 A1* | 8/2018 | Mullan | G05D 1/104 |

* cited by examiner

COMPUTING ANALYTICS BASED ON INDOOR LOCATION DATA STREAMS

CROSS-REFERENCE TO RELATED PATENT APPLICATIONS

The present application is a U.S. national stage application under 35 U.S.C. § 371 of PCT Application No. PCT/EP2017/076796, filed Oct. 19, 2017, which claims priority to Italian Patent Application No. 102016000105108 filed on Oct. 19, 2016. The disclosures of the aforementioned priority applications are incorporated herein by reference in their entireties.

PRIORITY CLAIM

This application claims priority from Italian Patent Application No. 102016000105108 filed on 19 Oct. 2016, the disclosure of which is incorporated herein by reference.

TECHNICAL FIELD OF THE INVENTION

The disclosed invention relates to tracking of entities, such as individuals and assets, in an indoor environment, and computing entity-related analytics, such as indicators and metrics, indicating the way the tracked entities relate to, namely move and use space in, the indoor environment.

The disclosed invention may for example be used to compute analytics on how customers move and shop in a retail store. The computed analytics may for example be used by the relevant store manager to optimise the store layout or the displays and to enhance the customer experience by optimising the staff allocation.

The disclosed invention may for example be also used to compute analytics on the quality of care provided by nurses in a hospital or nursing home environment. The computed analytics may for example be used to check the respect of procedures, and to optimise staff coordination and labour efficiency.

BACKGROUND ART

A report from the United States Environmental Protection Agency (U.S. EPA) shows that people spend approximately 93% of their time indoors (house, school, office, stores etc.). Recently, accurate indoor localisation technologies have become available, making it possible to deploy at scale indoor Location-Based Services (LBS).

One key indoor LBS refers to tracking how people move throughout an indoor environment. This information, coupled with a model of the environment, can be used to derive useful analytics. Another key indoor LBS refers to tracking the position of portable assets in indoor environments. This can be used to, e.g., faster find such assets whenever needed or monitor their usage.

Such analytics offer benefits in a variety of areas including commercial, business, healthcare, corporate, security, government, science, and others. For example, retail stores and brick and mortar businesses have long desired to gather data that would allow them to better understand customer behaviour and how such behaviour is influenced by the salespersons. In hospitals, the analysis of location data can allow to optimise processes, while reducing costs and improving patient's safety. In environments characterised by safety and security concerns (e.g., chemical plants, offshore rigs) the analysis of location data can be used to monitor the respect of safety procedures and to detect potential risk situations. In manufacturing plants location data can be used to monitor deviation from processes and procedures, allowing a better usage of resources and increasing the overall productivity.

A need is felt for a solution that allows location data to be accurately analysed and indoor location data streams to be accurately segmented into specific segments, also called tracks, which are relevant for the understanding of specific subject's behaviour. For example, tracks can correspond to shopping sessions in a retail environment, to a shift of a given staff member in a health and care facility etc. This is fundamental for computing relevant information for the understanding and modelling of subject's behaviour in a given environment.

CN 105 260 901 A discloses an RFID-based intelligent store real-time data map system that ca be used in a physical store to effectively record and display real-time positions and moving tracks of customers and goods in the store and interaction conditions between the customers and the goods. The real-time data map system comprises a position data acquisition module, an interaction data acquisition module, a data storage and analysis module, and a data map display module, wherein the position data acquisition module is realized through an RFID reader capable of reading real-time two-dimensional coordinates of an RFID label, the interaction data acquisition module is realized through the RFID reader capable of reading RFID label information entering a view field, and the real-time positions of the customers and the goods are displayed on the map in real time via the data map display module. The data storage and analysis module analyses positions and interaction data of the goods and the customers, results are displayed on the map via the data map display module, and a report form is generated at the same time.

SUBJECT AND SUMMARY OF THE INVENTION

The Applicant has experienced that in the relevant state of the art indoor analytics are computed to a large extent on a track level, that results in poor or deficient identification of tracks possibly leading to poor estimates of statistics and indicators of interest.

The Applicant has also realised that the relevant state of the art overlooks such a problem by suggesting simplistic solutions that fail to perform adequately in operational environments.

The Applicant has also experienced that in the relevant state of the art concerns about anonymity preservation are growing in the public opinion, policy makers and regulators, which are starting to caution on the widespread usage of, e.g., video cameras or Wi-Fi sensing tools for similar purposes.

Therefore, the Applicant has realised that two of the key technical challenges for providing high-quality statistics and reliable indicators are currently preserving anonymity and reliably and robustly identifying unique tracks in the presence of noisy and potentially erroneous data in the location data streams and without any need to include any personally identifiable information.

Object of the present invention is therefore addressing the above-indicating issues.

This object is achieved by the present invention, which relates to a system designed to track entities, such as individuals or assets, in an indoor environment, and to compute entity-related analytics, such as indicators and metrics, indicating the way the tracked entities relate to, namely move and use space in, the indoor environment, as claimed in the appended claims.

DETAILED DESCRIPTION OF EMBODIMENTS OF THE INVENTION

Figure 1:
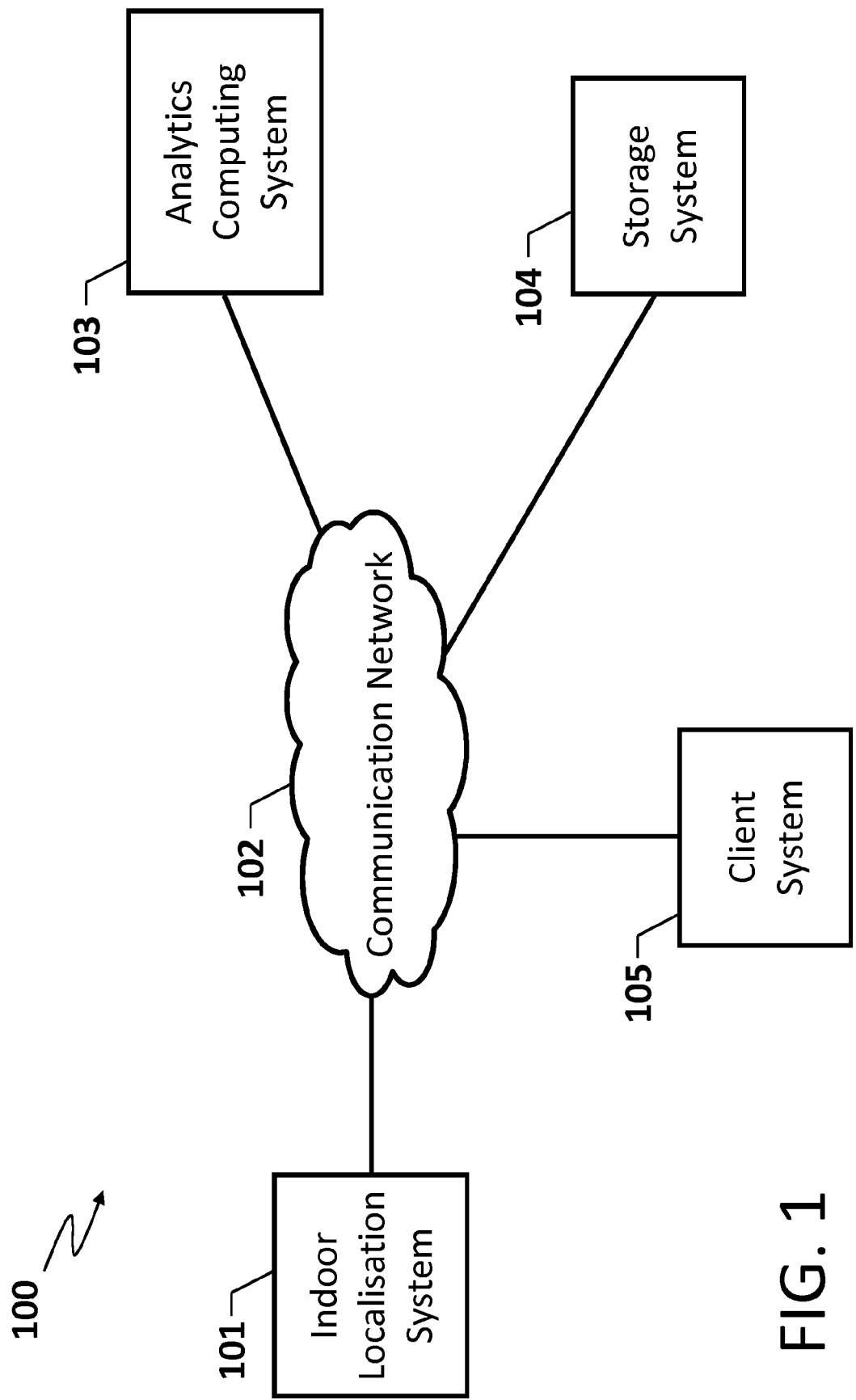
FIG. 1 is a system-level, block-diagram representation of the present invention.

The following description is provided to enable a person skilled in the art to make and use the invention. Various modifications to the embodiments will be readily apparent to those skilled in the art, without departing from the scope of the claimed invention. Thus, the present invention is not intended to be limited to the embodiments shown, but is to be accorded the widest scope consistent with the principles and features disclosed herein and defined in the appended claims.

Unless otherwise defined, all technical and scientific terms used herein have the same meaning as commonly understood by one of ordinary skill in the art to which the embodiments disclosed belongs. In the case of conflict, the present specification, including definitions, will control. In addition, the examples are illustrative only not intended to be limiting. In particular, the block diagrams depicted in the Figures and described are not to be construed to represent structural features, namely constructive limitations, but are to be construed to represent functional features, namely intrinsic properties of devices defined by the achieved effects or functional limitations and that may be implemented with different structures, so protecting the functionalities thereof (possibility to function).

For the purposes of promoting understanding of the embodiments described herein, reference will be made to certain embodiments and specific language will be used to describe the same. The terminology used herein is for the purpose of describing particular embodiments only, and is not intended to limit the scope of the present disclosure.

The definition of some of the terms used herein are given below. Any particular term not explicitly defined herein is used in accordance with customary usage by one of skill in the art.

As used herein, the terms "module" and "engine" refer to software, firmware, hardware, or other component that can be used to achieve a purpose. The engine will typically include software instructions that are stored in non-volatile memory (also referred to as secondary memory). When the software instructions are executed, at least a subset of the software instructions can be loaded into a memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term "database" is used broadly to include any known or convenient means for storing data, whether centralised or distributed, relational or otherwise.

As used herein a mobile device includes, but is not limited to, a cell phone, such as Apple's iPhone®, other portable electronic devices, such as Apple's iPod Touches®, Apple's iPads®, and mobile devices based on Google's Android® operating system, and any other portable electronic device that includes software, firmware, hardware, or a combination thereof that is capable of at least receiving the signal, decoding if needed, exchanging information with a server to verify information. Typical components of mobile device may include but are not limited to persistent memories like flash ROM, random access memory like SRAM, a camera, a battery, LCD driver, a display, a cellular antenna, a speaker, a Bluetooth® circuit, and WIFI circuitry, where the persistent memory may contain programs, applications, and/or an operating system for the mobile device.

As used herein, the term "computer" or "mobile device or computing device" is a general purpose device that can be programmed to carry out a finite set of arithmetic or logical operations. Since a sequence of operations can be readily changed, the computer can solve more than one kind of problems. A computer can include of at least one processing element, typically a central processing unit (CPU) and some form of memory. The processing element carries out arithmetic and logic operations, and a sequencing and control unit that can change the order of operations based on stored information. Peripheral devices allow information to be retrieved from an external source, and the result of operations saved and retrieved.

As used herein, the term "Internet" is a global system of interconnected computer networks that use the standard Internet protocol suite (TCP/IP) to serve billions of users worldwide. It is a network of networks that consists of millions of private, public, academic, business, and government networks, of local to global scope, that are linked by a broad array of electronic, wireless and optical networking technologies. The Internet carries an extensive range of information resources and services, such as the inter-linked hypertext documents of the World Wide Web (WWW) and the system to support email. The communications system of the Internet consists of its hardware components and a system of software layers that control various aspects of the architecture, and can also include a mobile device network, e.g., a cellular network.

As used herein, the term "session" refers to a period during which an entity, such an individual or an asset, carries out an activity in an environment, the period being characterised by a well-defined beginning, a well-defined end and a well-defined goal represented by the activity carried out by the entity. An example is a 'shopping session' in a supermarket, where the goal is to buy goods, the beginning corresponds to the entrance in the supermarket and the end with the exit from said supermarket. Another example is a 'patient session' in a clinic, whereby the goal may be, e.g. to perform a set of medical checks, the beginning corresponds to the registration at the patient desk and the exit corresponding to the discharge once the set of medical checks has been completed. One of the goals of the present invention is disclosing segmenting location data streams into tracks, each track consisting of location data points corresponding to a single session.

In the end, as used herein, the term "track" refers to a path followed by a tracked entity during a single session.

FIG. 1 depicts a system-level, block-diagram representation of a system according to the present invention and designed to track entities, such as individuals or assets, in an indoor environment, and to compute entity-related analytics, such as indicators and metrics, indicating the way the tracked entities relate to, namely, move and use space in, the indoor environment.

The system, referenced to as 100, comprises:
  an indoor localisation system 101 designed to localise entities in an indoor environment by means an appropriate localisation technology described hereinafter and responsively output associated indoor location data streams. Examples of tracked entities include, but is not limited to, products, smartphones, shopping carts/baskets, while examples of physical spaces include, but are not limited to, a retail environment, a shopping mall or a hospital;
  an analytics computing system 103 designed to receive and process the indoor location data stream from the indoor localisation system 101 to compute entity-related analytics based on the indoor location data stream;
  a storage system 104 designed to receive and store the location data streams from the indoor localisation system 101 and the entity-related analytics from the analytics computing system 103;
  a client system 105 comprising consumer applications designed to consume entity-related analytics produced by the analytics computing system 103 and stored in the storage system 104 to provide value-added services to end users; and
  a communication network 102 designed to allow the indoor localisation system 101, the analytics computing system 103, the storage system 104 and the client system 105 to communicate appropriately and exchange messages.

Figure 2:
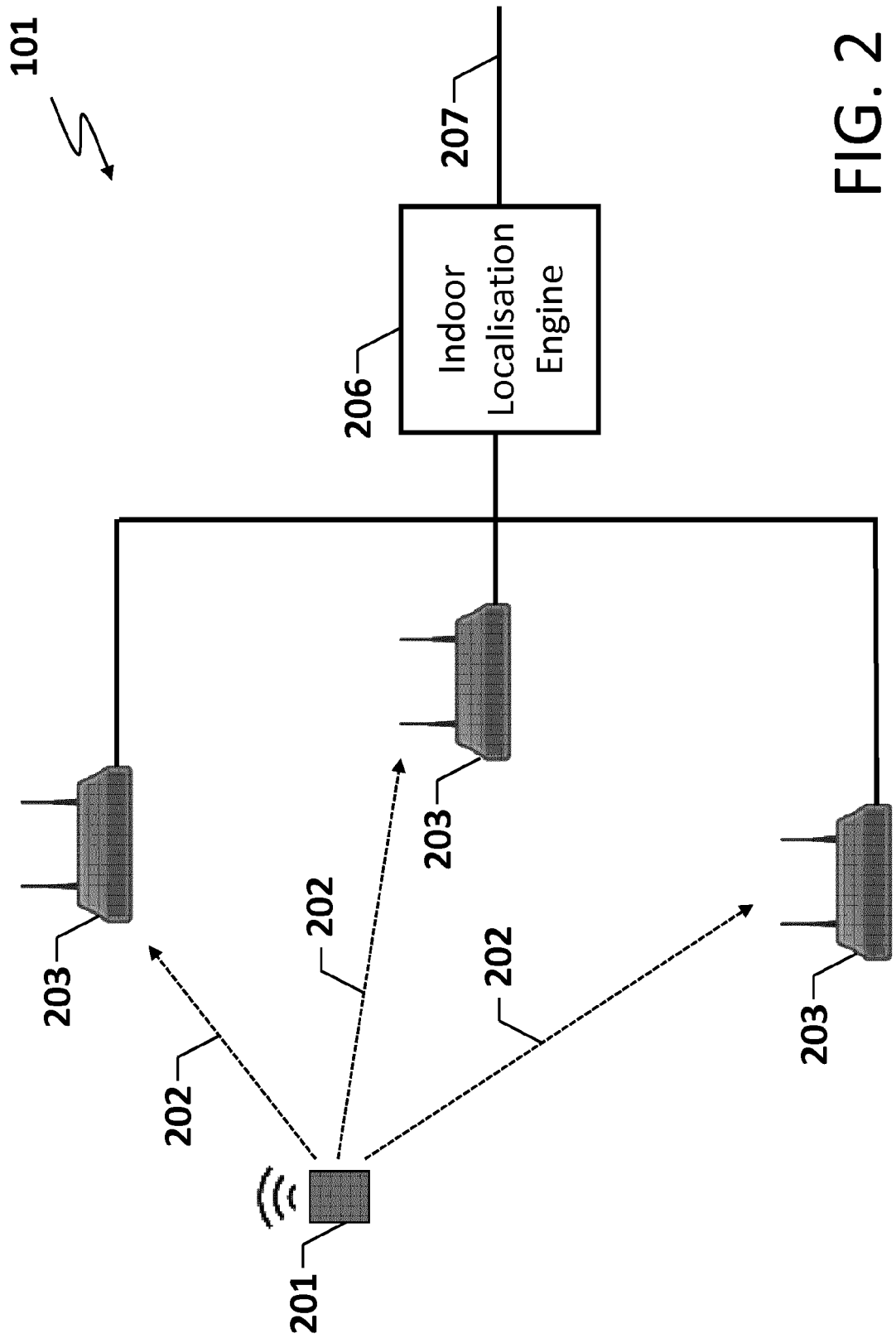
FIG. 2 is a block-diagram representation of a server-side embodiment of an indoor localisation system, in which entities to be tracked are actively localised based on signal received by antennas distributed over the indoor environment.

FIG. 2 shows a block-diagram representation of a server-side embodiment of the indoor localisation system 101, in which entities to be tracked are actively localised based on signals received by antennas distributed over the indoor environment.

In particular, the server-side embodiment of the indoor localisation system 101 comprises portable electronic devices 201, only one of which is depicted, which are assigned to the entities to be tracked, and are designed to broadcast wireless signals 202. Antennas 203 are arranged in the indoor environment to receive broadcasted wireless signals 202. Antennas 203 are connected to an indoor localisation engine 206 designed to receive and process the wireless signals 202 from the antennas 203 to estimate relative locations of the portable electronic devices 201 with respect to the antennas 203-204-205 based on characteristics of the received wireless signals 202. Relative locations of the portable electronic devices 201 may be estimated in terms of distances of the portable electronic devices 201 from the antennas 203 or as the angles formed by the portable electronic devices 201 with the antennas 203.

The indoor localisation engine 206 is further designed to compute, based on the relative location data and using state of the art methods, indoor locations of the portable electronic devices 201 with respect to an indoor reference system, and responsively output, for each portable electronic device 201, an indoor location data stream 207, hereinafter referred to as raw indoor location data stream, comprising:
  an arbitrary tracked entity identifier (ID) assigned by the system to the portable electronic device 201,
  indoor location data computed based on relative location data computed for the portable electronic device 201, and conveniently in the form of 3D coordinates <X,Y,Z> or 2D coordinates <X,Y> in the case of tracking over a two-dimensional space only, in an appropriate coordinate system (be it absolute or relative);
  accuracy data indicating the accuracy of the estimated location computed by the indoor localisation engine 206; and
  a timestamp indicating at which time the estimate was computed.

Figure 3:
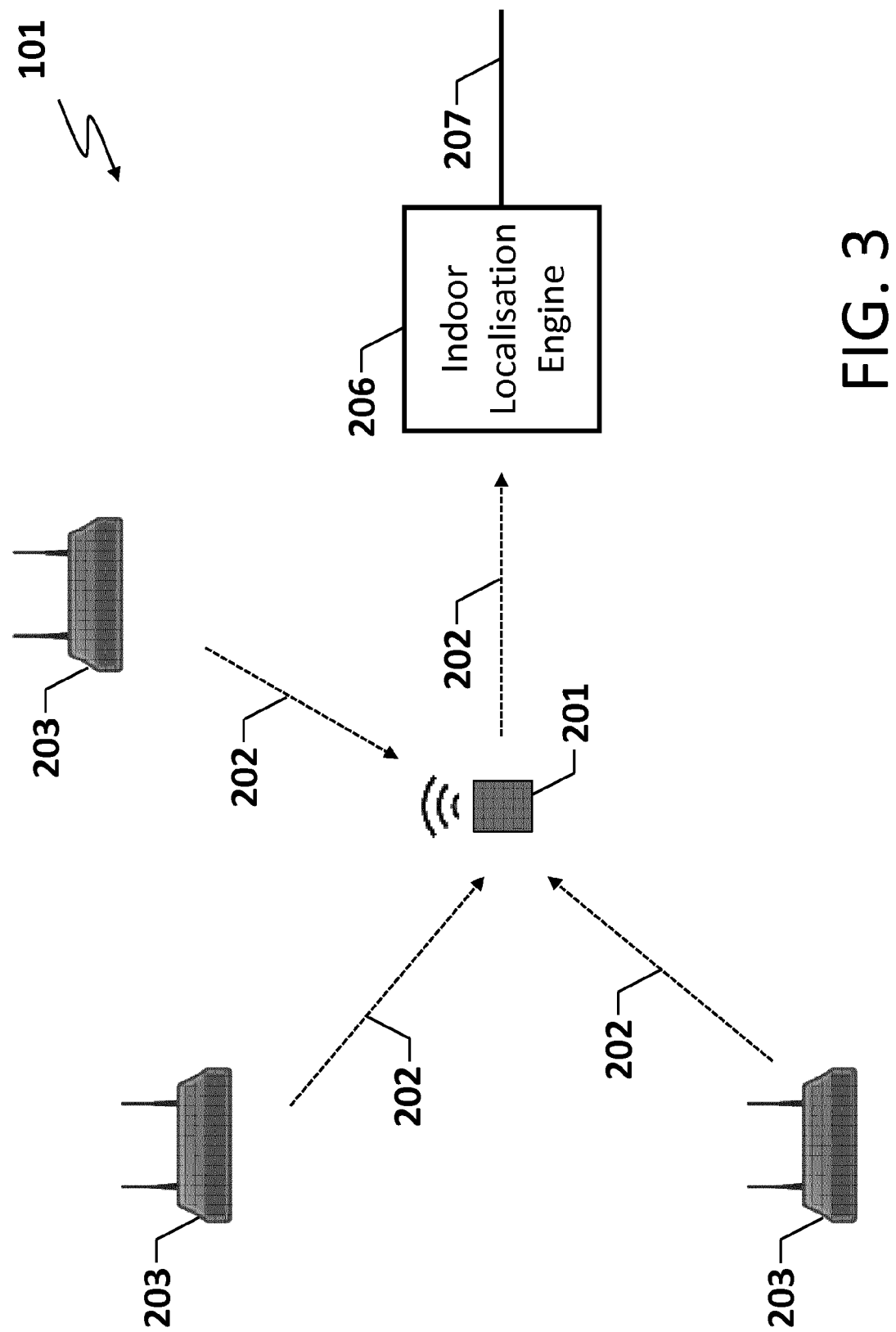
FIG. 3 is a block-diagram representation of a client-side embodiment of an indoor localisation system, in which entities to be tracked are passively localised based on signal broadcasted by antennas distributed over the indoor environment.

FIG. 3 shows a block-diagram representation of an alternative client-side embodiment of the indoor localisation system 101, in which entities to be tracked are passively localised based on signals broadcasted by antennas distributed over the indoor environment.

In particular, the client-side embodiment of the indoor localisation system 101 differs from the server-side embodiment thereof shown in FIG. 2 in that the antennas 203 are designed to broadcast wireless signals 202, and the portable electronic devices 201 assigned to the tracked entities are designed to receive and process the broadcasted wireless signals 202 to estimate relative locations of the portable electronic devices 201 with respect to the antennas 203 based on characteristics of the received wireless signals 202 and responsively output and supply associated relative location data to the indoor localisation engine 206 via wireless signals 202.

The indoor localisation engine 206 is designed to receive and process relative location data using state of the art methods to compute indoor locations of the portable electronic devices 201 with respect to an indoor reference system, and responsively output, for each portable electronic device 201, a raw indoor location data stream 207.

Figure 4:
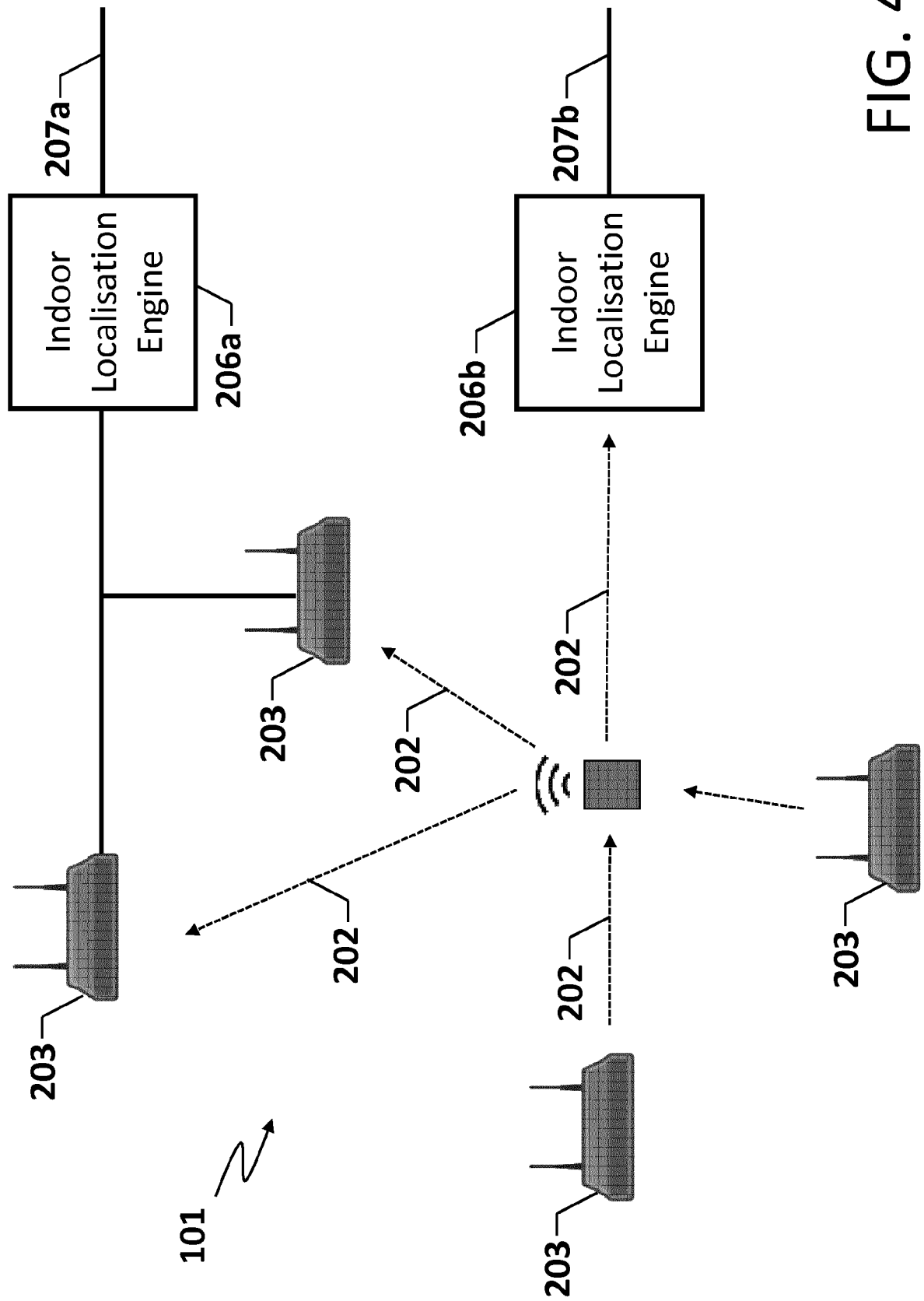
FIG. 4 is a block-diagram representation of a hybrid indoor localisation system, in which entities to be tracked are localised by combining the features of the server-side and client-side indoor localisation systems shown in FIGS. 2 and 3.

FIG. 4 shows a block-diagram representation of an alternative hybrid embodiment of the indoor localisation system 101, in which entities to be tracked are localised by combining the features of the client-side and server-side indoor localisation systems 101.

In particular, the hybrid indoor localisation system 101 comprises portable electronic devices 201 and antennas 203 both designed to broadcast wireless signals 202, as well as portable electronic devices 201 designed to receive and process wireless signals 202 broadcasted by antennas 203, and antennas 203 designed to receive wireless signals 202 broadcasted by portable electronic devices 201.

Wireless signals 202 received by antennas 203 are supplied to an indoor localisation engine 206a designed to receive and process the wireless signals 202 from the antennas 204 and output a first raw indoor location data stream 207a.

Wireless signals 202 received by portable electronic devices 201 are supplied to a different indoor localisation engine 206b designed to receive and process the wireless signals 202 from the portable electronic devices 201 and output a second raw indoor location data stream 207b.

The hybrid embodiment is applicable to scenarios in which different localisation systems, providing position estimates with different level of accuracy, coexist to monitor different parts of the target environment. As the ID is maintained across the various localisation systems in use, continuity in the tracking of relevant entities is guaranteed.

A raw indoor location data stream 207 (207a, 207b) is then supplied to the analytics computing system 103 for computation of associated entity-related analytics.

In the analytics computing system 103, the raw indoor location data stream 207 is initially subjected to a data cleaning process, by means of which the raw indoor location data stream 207 is transformed into a clean location data stream 208 having the same structure as the raw indoor location data stream 207.

Figure 5:
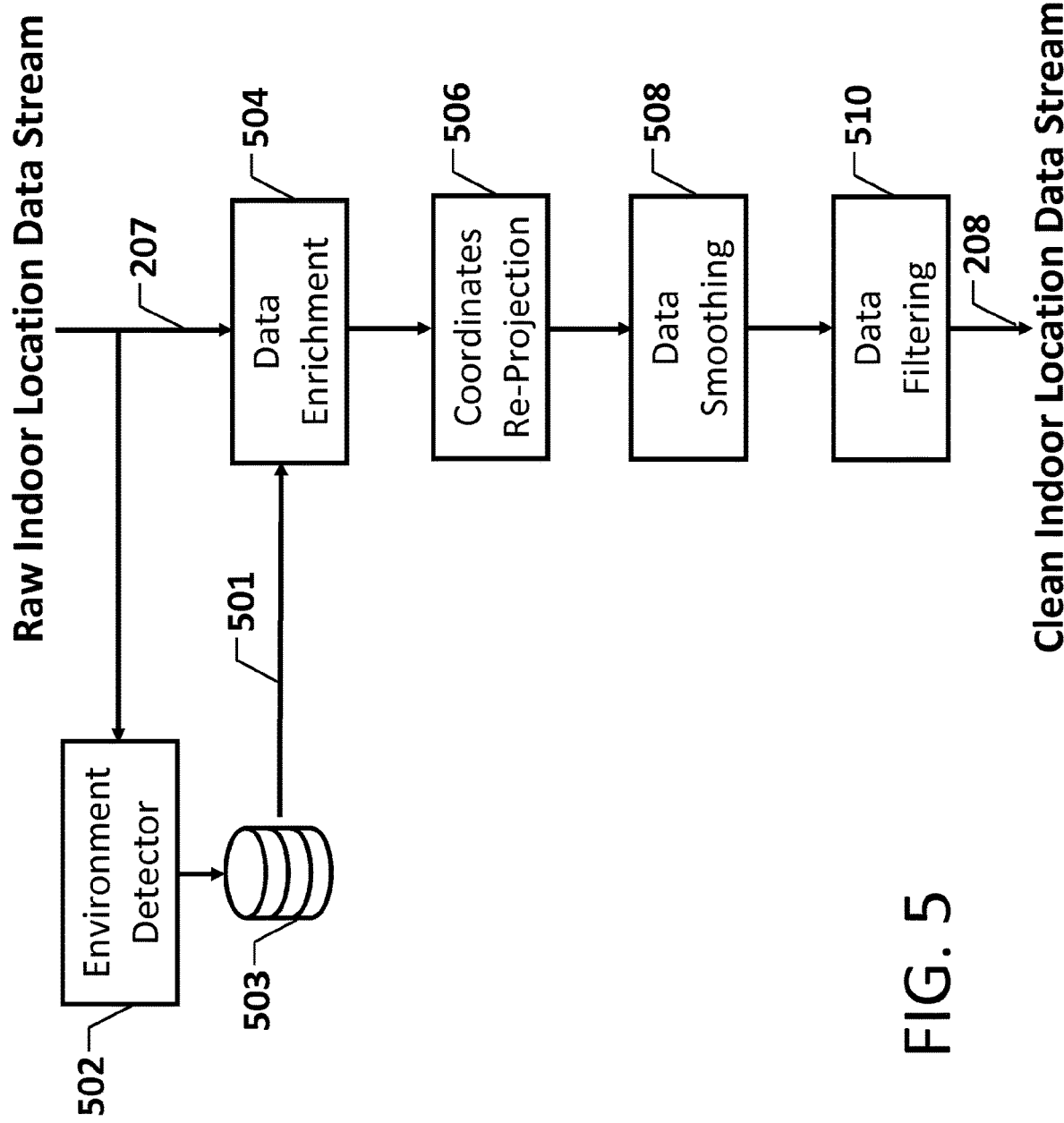
FIG. 5 is a flow-chart representation of indoor location data stream cleaning.

A flow-chart representation of the data cleaning process is shown in FIG. 5.

According to FIG. 5, the raw indoor location data stream 207 is first passed to an environment detector module 502 and a data enrichment module 504, and then sequentially through a coordinate re-projection module 506, a data smoothing module 508, and a data filtering module 510.

In the environment detector unit 502, the raw indoor location data stream 207 is processed to identify which indoor environment, out of a set of known ones, the associated tracked entity is moving into, to responsively fetch a corresponding indoor environment model 501 out from an indoor environment model database 503, where indoor environment models are stored, and to supply the fetched indoor environment model 501 to the data enrichment module 504.

In particular, the indoor environment model 501 details the indoor environment and comprises one or more session open/close rules that set out conditions on the indoor location data (e.g., "pass through one specific zone") or on external factors (e.g., the reception of a notification from a badging system, a condition on clock time, a condition depending on the current weather etc.) that result, when met, in a session being opened and closed, and, consequently, a track being started and ended.

In addition, the environment model 501 may further detail the various spatial barriers that cannot be traversed by the tracked entity. Examples of such barriers include walls, or displays in the aisle of a supermarket. The environment model can be used to minimise the impact of noisy, inaccurate or erroneous location data and to improve the value of the information being extracted.

The session open/close rules may be atomic, i.e., dependent upon one single condition, or composed, i.e., depending upon an arbitrary number of atomic conditions linked by logical Boolean operators such as AND, OR.

In an embodiment, the indoor environment model 501 may specify specific locations or areas through which the portable electronic devices 201 can enter and/or exit. Reference may for example be made to a use case represented by a supermarket, which can have one or multiple entrances and one exit. In another embodiment, the tracked entities may be workforce staff members, and session open/close rules may relate to badging-in/badging-out events, so that one track corresponds to one shift of one given employee. In another embodiment, the session open/close rules may include a combination of enter/exit zones and external factors. For example, a use case covers analytics on entities being computed only in case of a specific weather condition (e.g., shopping carts in a grocery stores being tracked only in case of rain, weather condition that may be verified via a third-party weather service). In another embodiment, the condition for a start/end track may depend on values measured by an external sensory system. An example may be a patient in a nursing home equipped with an indoor localisation system and who is equipped with a blood pressure sensor. If the blood pressure exceeds a given threshold value this triggers the track start, which in turn allows the system to alert the nursing home staff of a potential risk situation, the alert including information on the current location of the patient.

In the data enrichment module 504, indoor location data in the received raw indoor location data stream 207 are augmented with environment-specific metadata taken from the indoor environment model 501. In a possible embodiment, the data enrichment module 504 can add information about the coordinate system in use in the venue or definition of zones relevant for the environment addressed.

In the coordinate re-projection module 506, the coordinates of augmented indoor location data can be re-projected, if necessary, to a most suitable coordinate system. In a possible embodiment, (relative) Cartesian coordinates can be translated into a latitude/longitude coordinates and vice-versa.

In the data smoothing module 508, possible inconsistencies in indoor location data due to noise and/or errors introduced by the indoor localisation system 101 are smoothed out. The need for such a step comes from the fact that each localisation system localises entities with finite accuracy. Furthermore, environmental factors may result in noise leading to inaccurate location information provided by the indoor localisation system 101. In one embodiment, the data smoothing module 508 implements an exponential smoothing algorithm to process and smooth indoor location data. In another embodiment, the data smoothing module 508 uses a Kalman filter.

In the data filtering module 510, specific indoor location data are removed from the indoor location data stream, which specific indoor location data is known a priori based on the environment model 501 that should not be used for tracking purposes. The removed data may represent one or more of privacy-sensitive data such as tracking in restrooms, data generated outside opening hours of a given store, outliers in the data streams due to errors in the indoor localisation system 101 and that fail to respect spatiotemporal constraints on the environment (e.g., presence of walls and barriers), etc., as detailed in FIG. 6.

Figure 6:
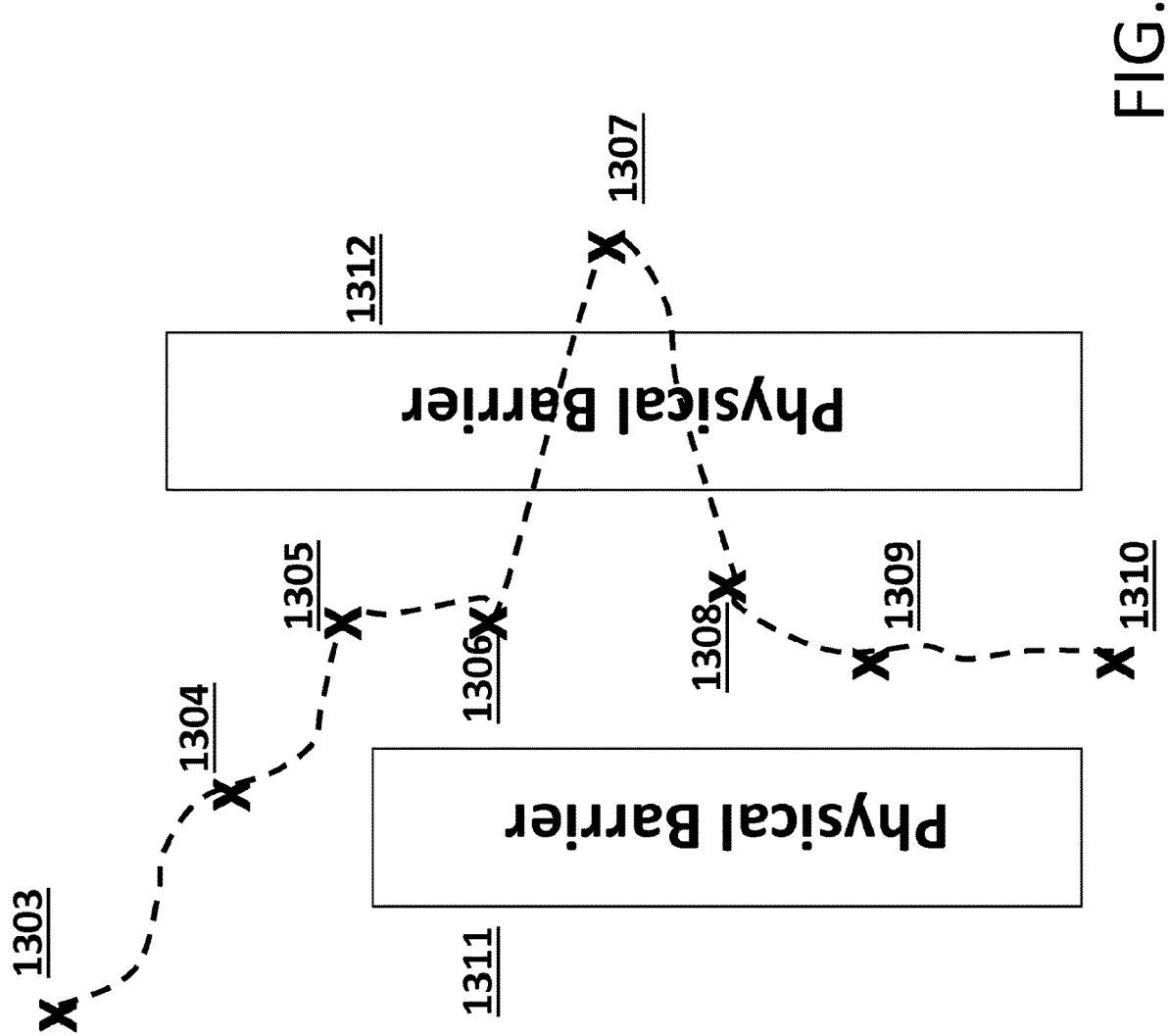
FIG. 6 is a graphical representation of indoor location data inconsistency and how it is resolved.

FIG. 6 is a graphical representation of a smoothed out indoor location data inconsistency.

In the example depicted, the indoor environment model 501 specifies two physical barriers 1311 and 1312, which, e.g., in a retail store may represent display shelves or display racks. In the example depicted, the indoor localisation system 101 output locations 1303-1310, all of which, taken singularly, fail to overlap with physical barriers 1301 and 1302, so complying with the indoor environment model 501. It is nonetheless apparent that the track traveled by the tracked entity is inconsistent with the indoor environment model 501 because location 1307 is an outlier, i.e., an erroneous location estimation made the indoor localisation system 101. The inconsistency is recognised by the data smoothing module 508 and remedied either by removing location 1307 from the track or replacing location 1307 with a location obtained by interpolating previous and subsequent locations in the track, i.e., 1306 and 1308 respectively.

In an alternative embodiment, the previously described data cleaning process may be performed by the indoor localisation engine 206 (206a, 206b) to directly output a (cleaned) indoor location data stream 208 based on the wireless signals 202.

In the analytics computing system 103, the cleaned location data stream 208 is then processed to compute entity-related analytics, namely metrics or key performance indicators, and to handle notifications, that are based on individual sessions.

Figure 7:
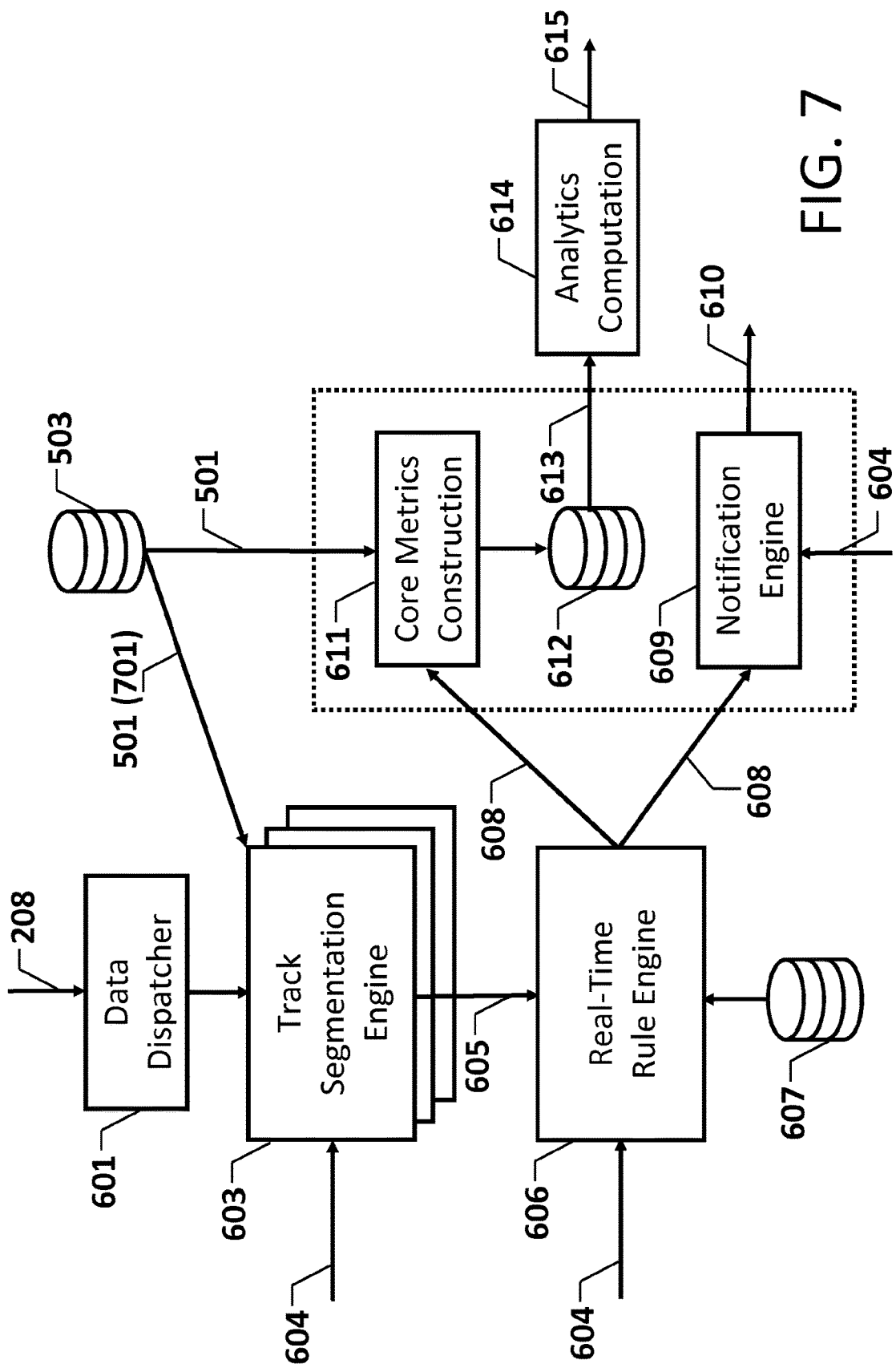
FIG. 7 is a block-diagram representation of indoor location data stream processing to reconstruct tracks and compute relevant indoor analytics.

To do so, as shown in the functional block-diagram representation depicted in FIG. 7, the cleaned indoor location data stream 208 is supplied, via a data dispatcher 601 provided to guarantee data durability, to an instance of a track segmentation engine 603, which is designed to receive also the indoor environment model 501 from the indoor environment model database 503, as well as external event feeds 604, if any, such as check-in/check-out events generated from an external system, for track reconstruction accuracy improvement purposes, and to process the cleaned indoor location data stream 208 based on the session open/close rules 701 in the indoor environment model 501 and external event feeds 604, if any, to:
    identify one or more individual sessions representing corresponding periods during which the tracked entity carries out associated activities in the indoor environment, and
    for each identified session, compute track data 605 comprising indoor location data in the cleaned indoor location data stream 208 and pertaining to the track traveled by the tracked entity during the identified session.

Track data 605 are fed, along with external events 604, such as check-in/check-out events generated from an external system, to a real-time rule engine 606, where the track data 605 are matched against a set of environment-specific rules taken from a rule repository 607, and track reconstruction events 608 are responsively outputted for further processing, also based on the external events 604.

The real-time rule engine 606 may be designed to generate a track reconstruction event 608 every time a new session is opened or every time a tracked entity enters a given area or yet every time new track data 605 is outputted by the track segmentation engine 603.

Track reconstruction events 608 outputted by the real-time rule engine 606 are supplied to a notification engine 609 and a core metrics construction module 611.

The notification engine 609 is designed to receive track reconstruction events 608 from the real-time rule engine 606 and external events 604, and to deliver notification messages 610 to notification service subscribers and over the desired channel, e.g., smartphone app notification, email, sms etc. Examples of notifications include, e.g., a notification to a shopper who has lingered in a given area for a very long time, and may require assistance by the store staff.

The core metrics construction module 611 is designed to receive track reconstruction events 608 from the real-time rule engine 606 and the indoor environment model 501 from the indoor environment model database 503, and makes use of a library of commonly employed statistical functions (including, e.g., average, median, sum, presence, quantile-quantile computation etc.) to compute a set of pre-determined core metrics 613 for the specific environment, that are stored in a core metric database 612. Examples of core metrics include number of tracked entities present at any time in a given zone, cumulative number of open sessions at any time instant, average duration of tracks, average time spent in a given zone etc.

An analytics computation module 614 is designed to fetch core metrics 613 from the core metric database 612 and to combine the fetched core metrics 613 to distil actionable analytics 615.

Figure 8:
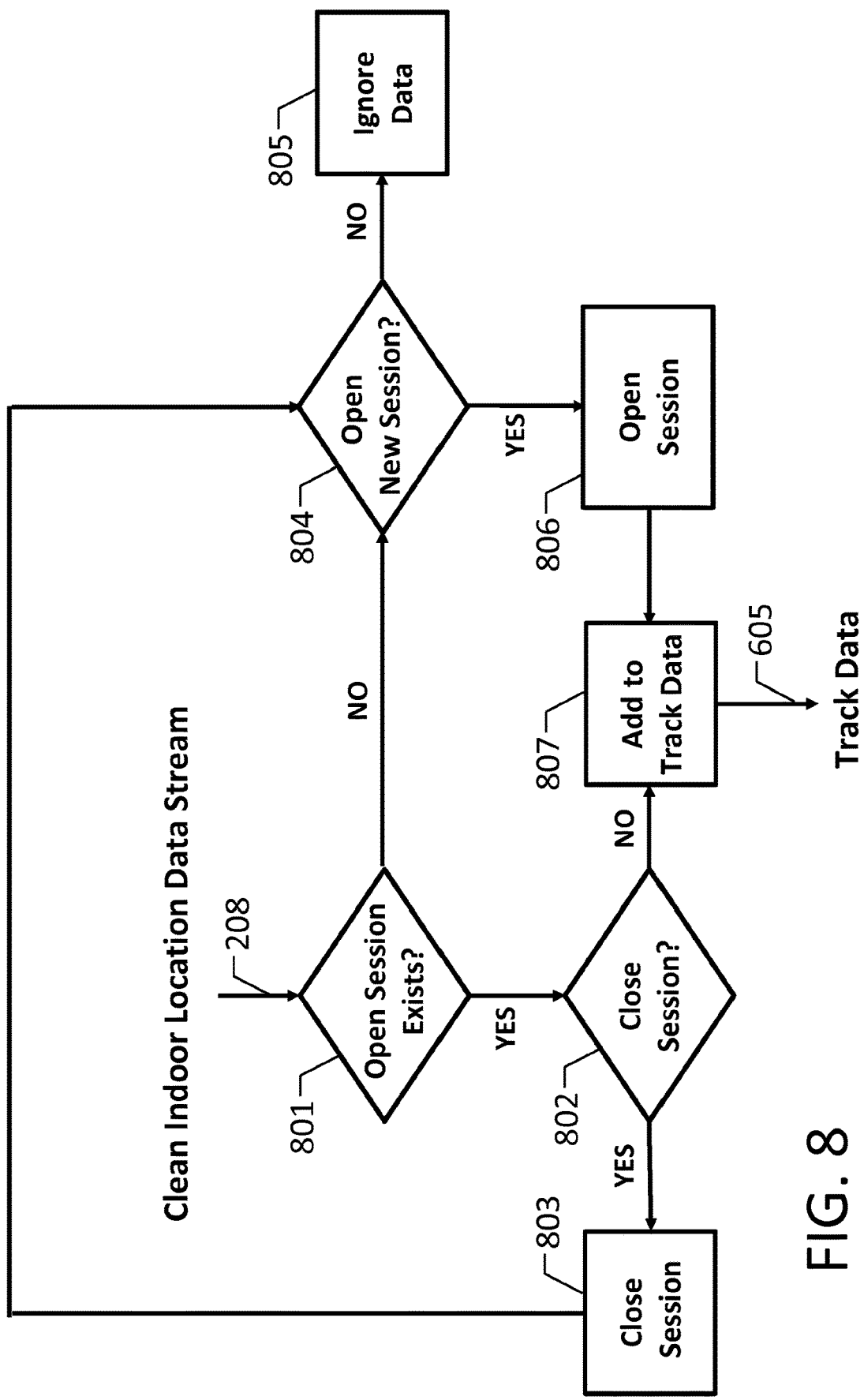
FIG. 8 is a flow-chart representation of segmentation of an indoor location data stream into track data.

FIG. 8 depicts a flow-chat representation of how the track segmentation engine 603 in FIG. 7 segments cleaned indoor location data stream 208 into track data 605.

When the cleaned indoor location data stream 208 is dispatched to the session segmentation engine 603, the latter is designed to first check (801) whether an open session exists. If an open session exists, the session segmentation engine 603 determines (802) whether the session is to be closed based on the session open/close rules 701 in the indoor environment model 501.

If the open session is determined to be closed, the session is closed (803). A session may be closed, e.g., if the indoor location data in the cleaned indoor location data stream 208 indicates that the tracked entity is in one the exit zones defined in the indoor environment model 501, or when time elapsed since the reception of the last indoor location data exceeds a given threshold defined in the indoor environment model 501, or if a given external event is received, for example signalling that a staff member has badged out, or if the current weather conditions, as specified by a third party service, satisfy a given condition (e.g., absence of rain or temperature exceeding a given level), or if the timestamp exceeds a given time (e.g., midnight).

If an open session is determined to exist and not be closed, the indoor location data in the cleaned indoor location data stream 208 and relating to the track associated to open session is added (807) to the track data 605 relating to the track associated to the open session.

If an open session is determined not to exist, the session segmentation engine 702 determines (804) whether a new session is to be opened based on the session open/close rules 701 in the indoor environment model 501.

A new session is determined to be opened if, e.g., the indoor location data in the cleaned indoor location data stream 208 indicates that the tracked entity just exited one of the start zones defined in the indoor environment model 501, or if a given external event is received, for example signalling that a staff member has badged in, or if the current weather conditions, as specified by a third party service, satisfy a given condition (e.g., presence of rain or temperature exceeding a given level), or if the timestamp exceeds a given time (e.g., midnight).

If a new session is determined not to be opened, the indoor location data in the cleaned indoor location data stream 208 is simply ignored (805).

If a new session is determined to be opened, a new session is opened (806), and the indoor location data in the cleaned indoor location data stream 208 and relating to the track associated to the new open session is added (807) to the track data 605 relating to the track associated to the open session.

Figure 9:
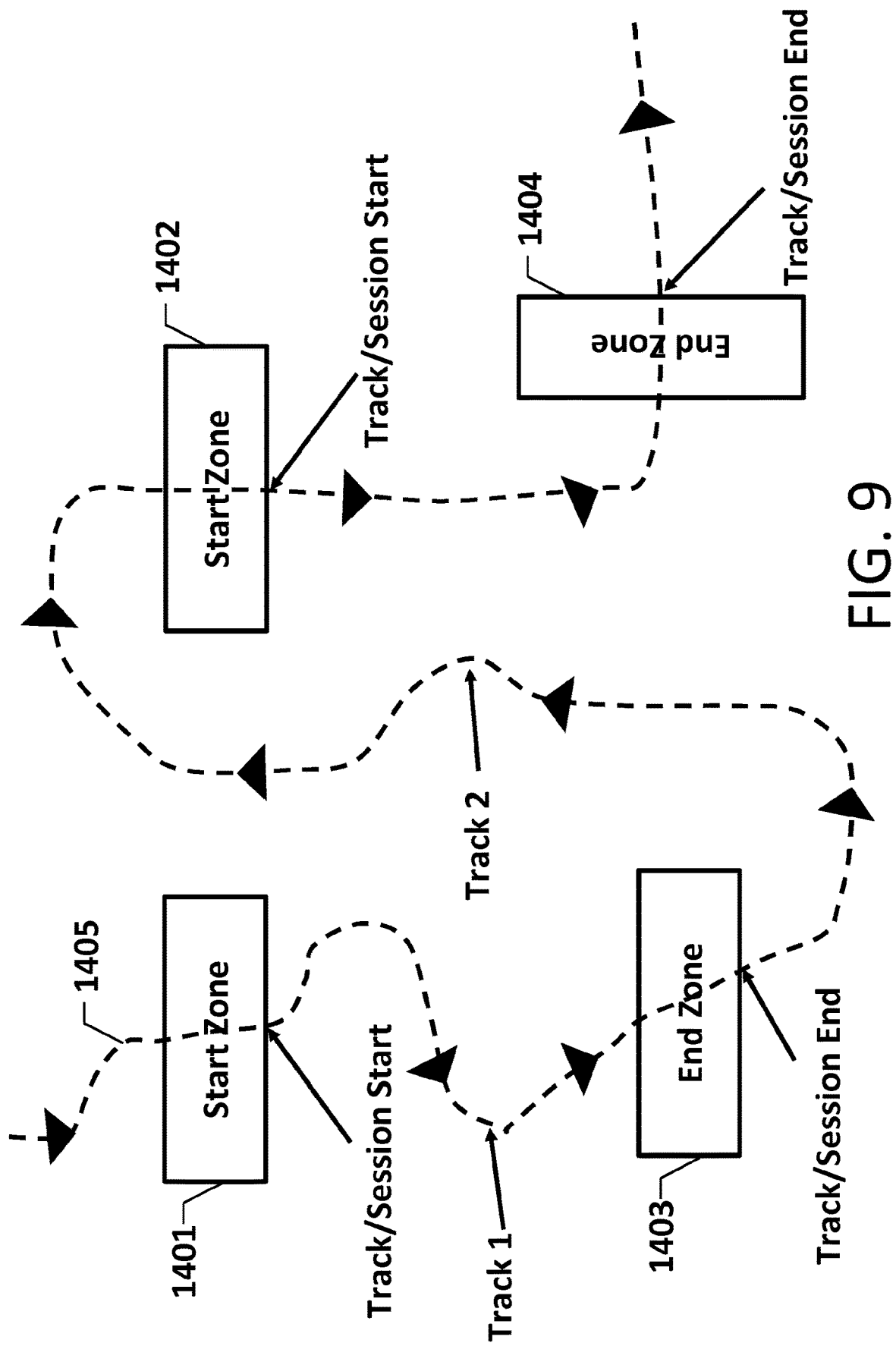
FIG. 9 is a graphical representation of segmentation of an indoor location data stream into track data.

FIG. 9 graphically depicts operations relating to indoor location data stream segmentation into tracks as described in FIG. 8. In the example depicted, the session open/close rules 701 in the indoor environment model 501 define an indoor environment with two start zones 1401 and 1402, and two end zones 1403 and 1404. Dashed line 1405 represents the path traveled by the tracked entity as measured by the indoor localisation system 101. For example, in a retail environment, in particular a grocery store, start zones 1401 and 1402 are the zones where shopping baskets can be taken upon entrance in the store, end zones 1403 and 1404 are the zones where shopping baskets can be left after having reached the checkout counter, and the dashed line 1405 represents the path traveled by a shopping basket or a shopping cart. As shown:

two tracks are opened by the track segmentation engine 603 when the tracked entity passes through the start zones 1401 and 1402, the tracks are closed by the track reconstruction engine 703 when the tracked entity passes through the end zones 1403 and 1404, and indoor location data in the indoor location data stream 208 and relating to the first track is grouped to form track data 605 relating to the first track, and indoor location data in the indoor location data stream 208 and relating to the second track is grouped to form track data 605 relating to the second tracks, indoor location data in the indoor location data stream 208 is discarded until the tracked entity reaches the first start zone 1401, after the tracked entity exits the first end zone 1403 and until the tracked entity reaches the second start zone 1402, and after the tracked entity exits from the second end zone 1404.

In a retail environment, in particular in a grocery store, this would be interpreted as:

shopper A took the shopping basket from area 1401, went shopping and then left it in area 1403, store staff member B took the shopping basket from collection area 1403 and brought it into start area 1402, and shopper C took the shopping basket from area 1402, went shopping and finally left it in deposit area 1404.

In this example, two distinct shopping sessions are recognised, interwoven by locations not corresponding to a shopping session.

Figure 10:
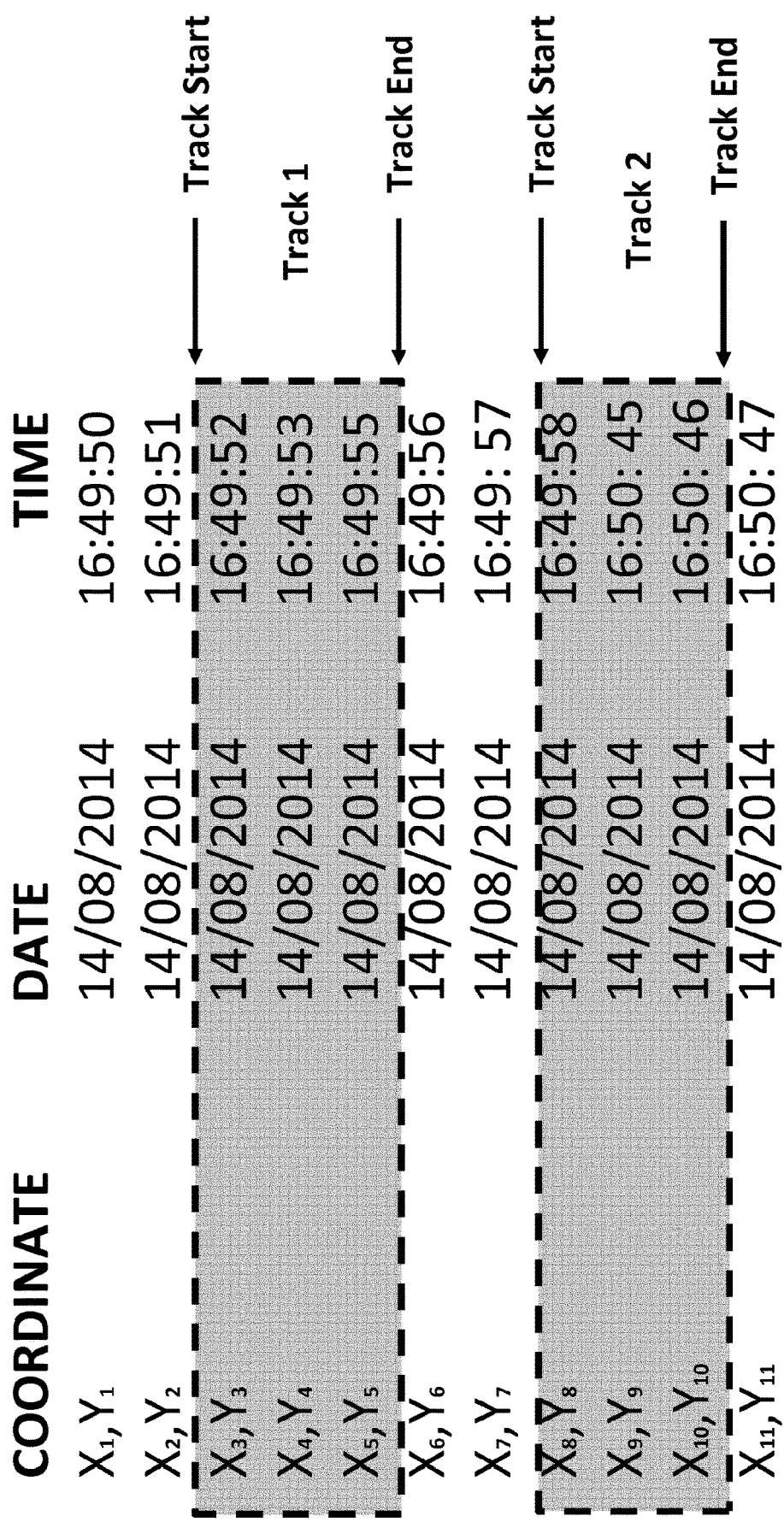
FIG. 10 shows an indoor location data stream segmented into track data.

FIG. 10 shows an indoor location data stream segmented into tracks and relating to the example shown in FIG. 9.

Each record includes location data in the form of coordinate pairs <Xi,Yi>, as well as a timestamp (for the sake of clarity shown as two separate fields date and time), where the subscript T defines the i-th sample returned by indoor localisation system 101 and referring to one single entity being tracked, and where the accuracy data has been omitted. By detecting the presence of the tracked entity in the start/end zones, two distinct shopping sessions are effectively identify, which are labelled "Track 1" and "Track 2", with the corresponding indoor location data and timestamps highlighted in light grey colour. The remaining indoor location data and timestamps are discarded and, hence, disregarded for the computation of metrics, key performance indicators and analytics.

In details, as may be seen, out of the indoor location data outputted by the indoor localisation system 101, the first two entries are discarded as no track is open and no new track is opened. The tracked entity is determined to have moved out of the start zone 1401 in FIG. 9, and Track 1 is opened. Coordinate pairs $<X_3,Y_3>$, $<X_4,Y_4>$, $<X_5,Y_5>$ are hence considered and assigned to Track 1. Coordinate pair $<X_5, Y_5>$ is determined to correspond to the end zone 1403 in FIG. 10, and, hence, Track 1 is closed. The following coordinate pairs are discarded, until the tracked entity is determined to have move out of the start zone 1402 in FIG. 9, and Track 2 is opened. The following coordinate pairs $<X_8,Y_8>$, $<X_9,Y_9>$, $<X_{10},Y_{10}>$ are considered and assigned to Track 2, until the tracked entity is determined to have moved into the end zone 1404 in FIG. 9. Coordinate pair $<X_{10},Y_{10}>$ is determined to correspond to the end zone 1404 in FIG. 9, and, hence, Track 2 is closed. The following coordinate pairs are discarded.

Figure 11:
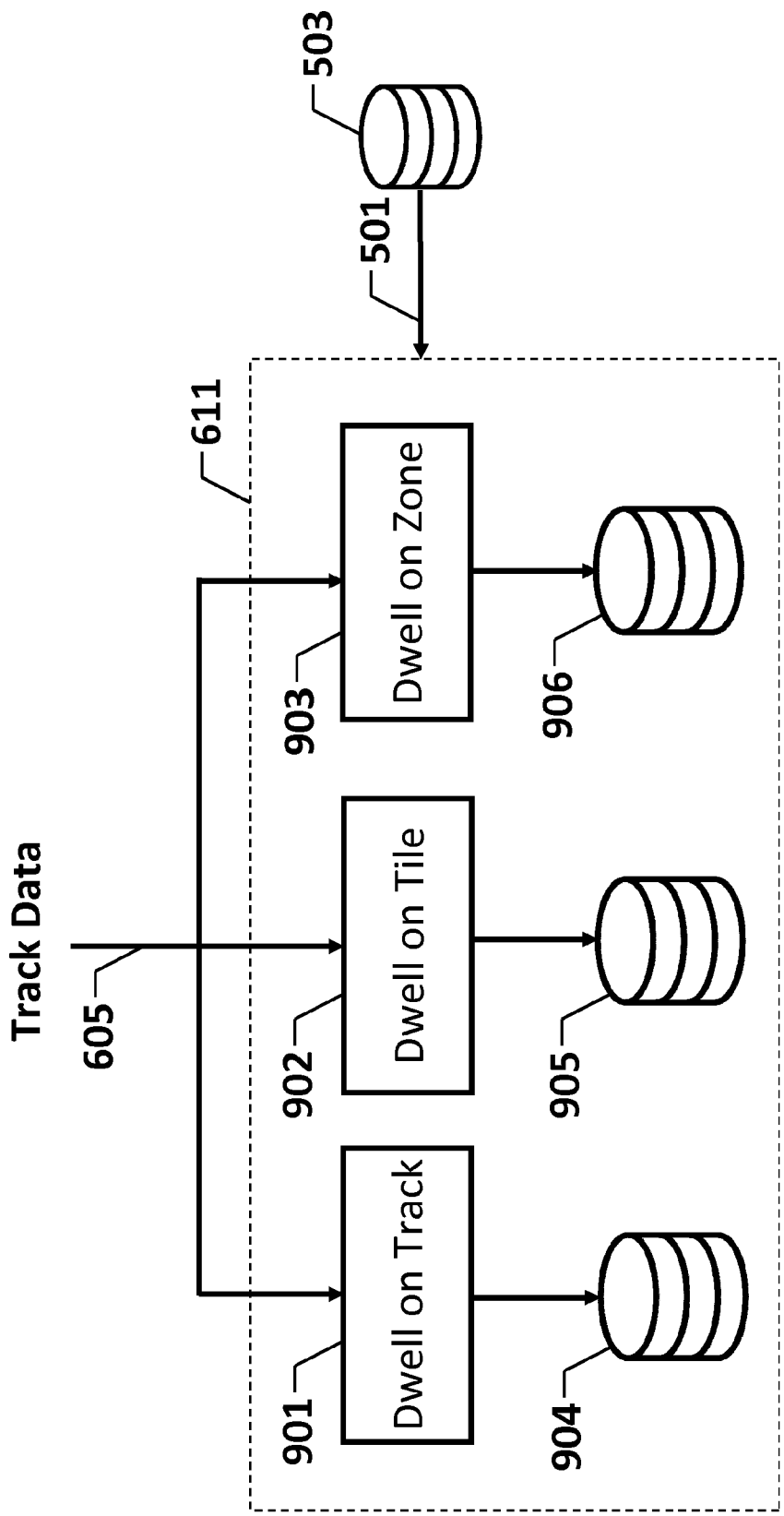
FIG. 11 is a block-diagram representation of how each track is processed to compute core metrics.

FIG. 11 depicts a block-diagram representation of operations performed by the core metrics construction module 611. Track reconstruction events 608 from the real-time rule engine 606 is dispatched to three computational modules 901-902-903, which are also inputted with the indoor environment model 501 and output corresponding data that are stored in associated databases 904, 905, 906.

In particular, a first computational module 901 is designed to compute a track-level dwell time, which represents, e.g., the duration of shopping sessions in a retail environment and is stored in an associated dwell-on-track database 904.

A second computation 902 is designed to compute tile-level dwell time, which is stored in an associated dwell-on-tile database 905, where a tile is a discrete unit composing the environment being analysed (see FIG. 12 for details), and where the actual location and size of a tile is specified in the indoor environment model 501.

A third computational module 903 is designed to compute zone-level dwell time, which is stored in an associated dwell-on-zone database 906, where a zone may correspond, e.g., in a retail application to an aisle of the store, or to an area of a store where a given category is on sale, and where the actual location and size of a zone is specified in the indoor environment model 501.

Figure 12:
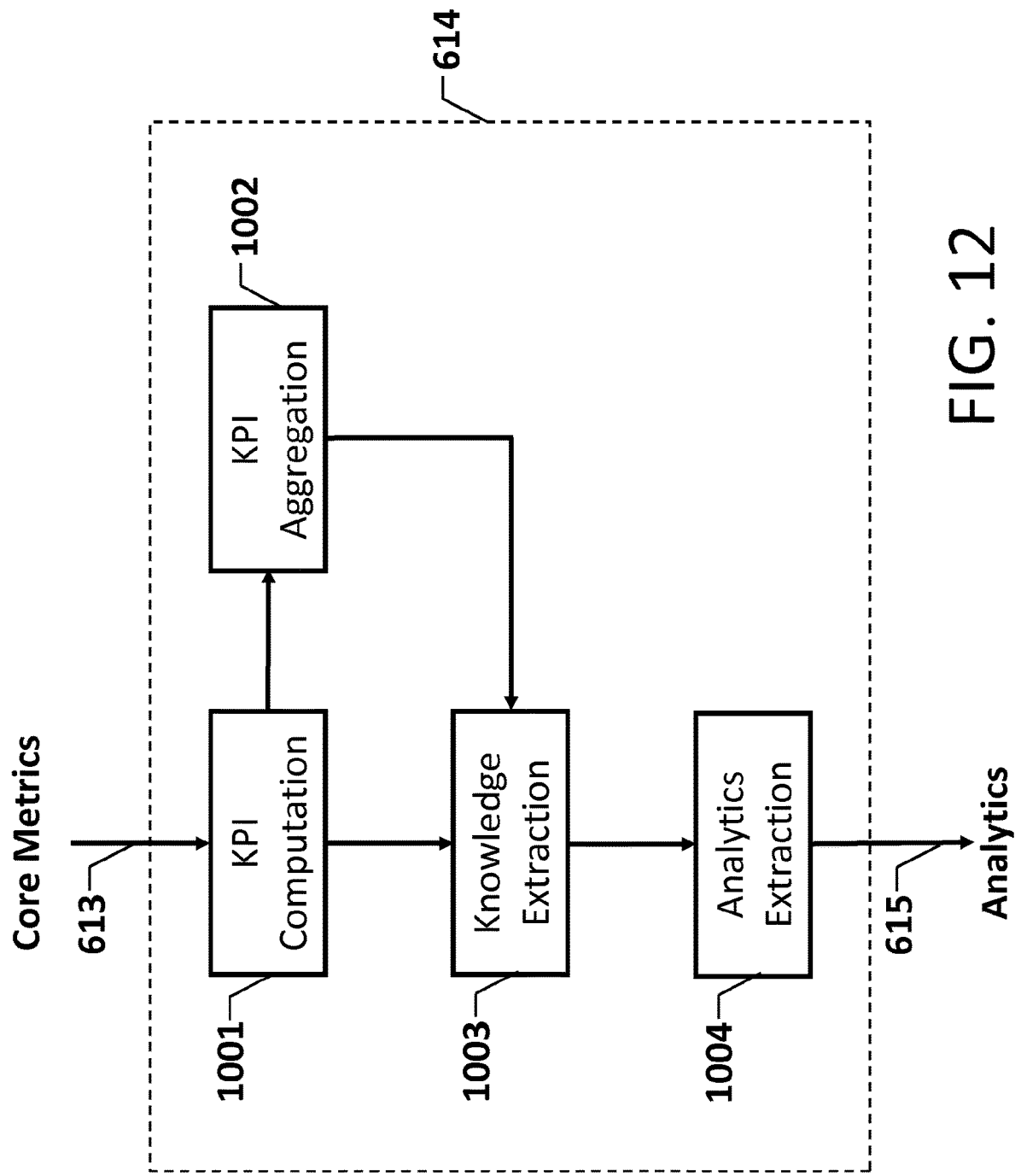
FIG. 12 is a flow-chart representation of how core metrics are processed to compute analytics.

FIG. 12 depicts a functional block-diagram representation of the analytics computation module 614.

A KPI computation module 1001 is designed to fetch core metrics 613 from the core metric database 612 and compute and output relevant Key Performance Indicators (KPIs). An example of KPI is an average dwell time computed based on track-level dwell times stored in the dwell-on-track database 904.

The computed KPIs are fed to a KPI aggregation module 1002, where individual KPIs are aggregated, and to a knowledge extraction module 1003, which is also inputted with aggregated KPIs and is designed to extract relevant knowledge from individual and aggregated KPIs.

Extracted relevant knowledge is provided to an analytic extraction module 1004 designed to compute actionable analytics based on the extracted knowledge from knowledge extraction module 1003.

An example of aggregated KPIs is the average dwell time computed for specific days of the week, for specific time slots, etc., an example of knowledge extracted from individual and aggregated KPIs are correlations among individual KPIs, trends within individual KPIs, ranking among individual KPIs, etc., and an example of analytics includes suggestions on how to optimise the layout of the indoor environment, or recommendations on how to optimise staff allocations during opening hours.

Figure 13:
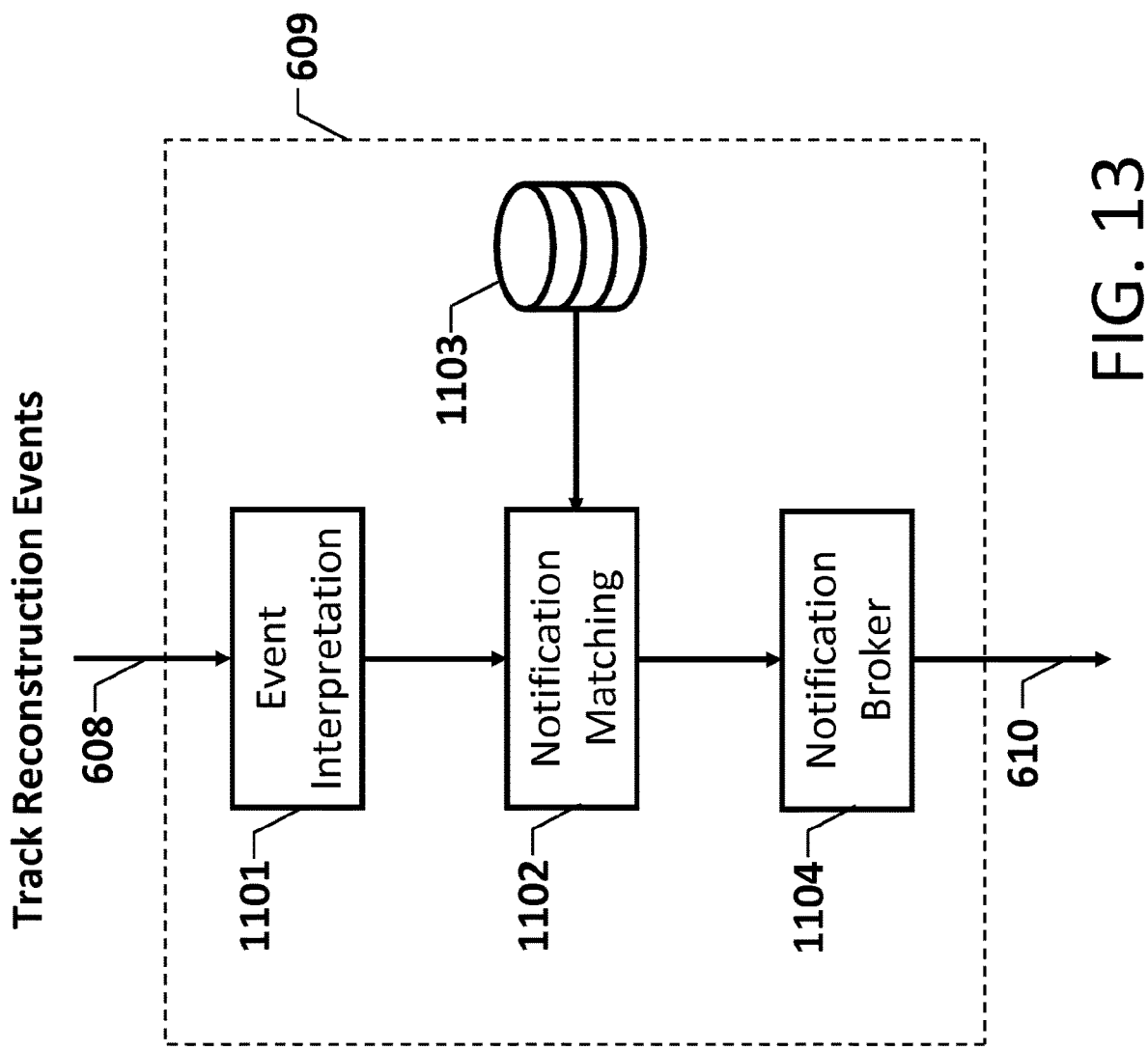
FIG. 13 is a flow-chart representation of how notifications are generated and dispatched starting from track reconstruction and core metrics events.

FIG. 13 depicts a functional block-diagram representation of the notification engine 609.

The notification engine 609 is designed to receive from the real-time rule engine 606 both track reconstruction events 608 and external events 604, which are first processed in an event interpretation module 1101, where the track reconstruction events 608 and the external events 604 are interpreted in order to verify whether high-level conditions are met. As an example, track reconstruction events 608 may notify that there are fifty open tracks, which, in a retail store this condition corresponds to as many customers, and the event interpretation module 1101 may translate this into 'Store is crowded' interpreted high-level condition.

Interpreted high-level conditions are then passed to a notification matching unit 1102 designed to match interpreted high-level conditions against a set of notification rules maintained in a notification rule database 1103 to output notifications which are sent to a notification broker module 1104 design to dispatch the notification messages 610 to a user/service over a channel. To this purpose, notification rules are stored as pairs <condition, action>, where condition identifies an interpreted high-level condition and action defines an action to be undertaken, in the form of a notification to be sent to a given (set of) user(s) over a given channel and including a description of an associated notification message 610.

Figure 14:
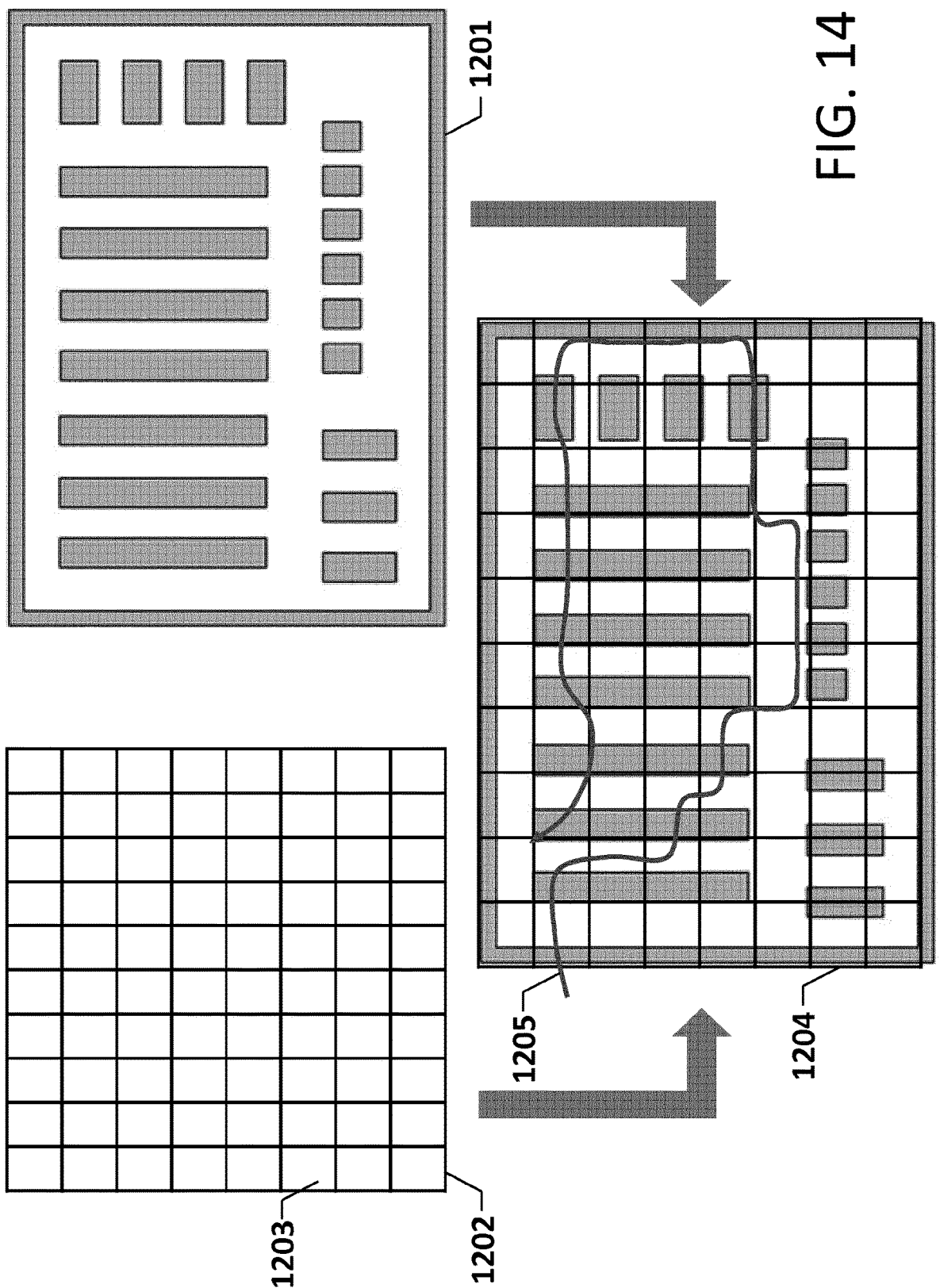
FIG. 14 is a graphical representation of how an indoor environment can be modelled in a computer-readable format starting from a store layout using tiles in a grid model.

FIG. 14 depicts a graphical representation of how an indoor environment can be modelled in a suitable computer-readable format starting from a store layout and using tiles in a grid model.

In particular, combining a store layout 1201 with a grid 1202 made up of several tiles 1203 results in a tiled representation 1204 of the store layout. Individual grid tiles 1203 represent the spatial granularity level at which the analysis is carried out. Each tile 1203 is identified by a unique identifier. In this way, a track 1205 can be mapped to tiles 1203 in the grid 1202. Accordingly, track data 605 can be represented as an ordered sequence of tiles, so discretising the path traveled by a tracked entity. Discretisation allows computation of spatial analytics such as heat-maps, graphically representing a frequency of visits of different tiles of the store, or tiles where customers spend more time, by means of an appropriate colour palette.

The invention claimed is:

1. A system comprising:
    an indoor localisation system to localise a tracked entity in an indoor environment and to output an indoor location data stream comprising indoor location data representing locations assumed by the tracked entity in the indoor environment; and
    an analytics computing system designed to receive and process the indoor location data stream from the indoor localisation system to compute entity-related analytics;
    wherein the analytics computing system is designed to:
        identify in the indoor location data stream one or more sessions, each representing a corresponding period during which a tracked entity carries out an associated activity in the indoor environment, based on an indoor environment model specifying one or more session open/close rules,
        compute, for one or more identified sessions, associated track data representing a track travelled by the tracked entity in the indoor environment during an identified session, based on the indoor location data stream, and
        compute entity-related analytics based on the track data; and
    wherein the analytics computing system is further designed to compute track data for an associated session by forming the track data with the indoor location data in the indoor location data stream and pertaining to the associated session by:
        determining whether an open session exists;
        if an open session is determined to exist, determining whether the open session is to be closed based on the session open/close rules in the indoor environment model;
        if an open session is determined not to exist, determining whether a new session is to be opened based on the session open/close rules in the indoor environment model;
        if an open session is determined to exist and not to be closed, adding the indoor location data in the cleaned indoor location data stream and relating to the track associated to the open session to the relevant track data; and
        if an open session is determined not to exist and a new session is determined to be opened, adding the indoor location data in the indoor location data stream and relating to the track associated to the new session to the relevant track data.

2. The system of claim 1, wherein the analytics computing system is further designed to:
    compute track reconstruction events based on track data and environment-specific rules;
    deliver notifications in response to track reconstruction events;
    compute a set of pre-determined core metrics for the specific environment in response to track reconstruction events and based on the indoor environment model; and
    compute entity-related analytics based on the core metrics.

3. A system comprising:
    an indoor localisation system to localise a tracked entity in an indoor environment and to output an indoor location data stream comprising indoor location data representing locations assumed by the tracked entity in the indoor environment; and
    an analytics computing system designed to receive and process the indoor location data stream from the indoor localisation system to compute entity-related analytics;
    wherein the analytics computing system is designed to:
        identify in the indoor location data stream one or more sessions, each representing a corresponding period during which a tracked entity carries out an associated activity in the indoor environment, based on an indoor environment model specifying one or more session open/close rules,
        compute, for one or more identified sessions, associated track data representing a track travelled by the tracked entity in the indoor environment during an identified session, based on the indoor location data stream, and
        compute entity-related analytics based on the track data;
    wherein the indoor localization system is designed to output a raw indoor location data stream, and wherein either the indoor localization system or the analytics computing system is further designed to data clean the raw indoor location data stream based on the indoor environment model to output a clean location data stream for further processing; and wherein data cleaning comprises:
processing the raw indoor location data stream to identify an indoor environment in which the associated tracked entity is moving into;
responsively fetching a corresponding indoor environment model out from an indoor environment model database;
and one or more of the following:
augmenting indoor location data in the raw indoor location data stream with environment-specific metadata from the indoor environment model;
smoothing out possible inconsistencies in indoor location data due to noise and/or errors in the indoor localisation system; and
filtering out possible specific indoor location data that should not be used for tracking purposes based on the indoor environment model.

4. The system of claim 1, further comprising:
a storage system to receive and store the location data streams from the indoor localisation system and the entity-related analytics from the analytics computing system; and
a client system to consume entity-related analytics to provide value-added services to end users; and
a communication network to allow the indoor localisation system, the analytics computing system, the storage system and the client system to communicate.

5. The system of claim 1, wherein the indoor location data stream comprises:
a tracked entity identifier (ID);
indoor location data;
indoor location data computation accuracy data; and
indoor location data computation timestamp.

6. A non-transitory computer-readable media storing executable instructions that, when executed by one or more processors, causes the analytics computing system to become configured as claimed in claim 1 so as to compute entity-related analytics.

* * * * *